(12) United States Patent
Clark

(10) Patent No.: US 6,354,322 B2
(45) Date of Patent: Mar. 12, 2002

(54) ELECTRIC VALVE UNIVERSAL RETROFIT CONFIGURATION HAVING MISALIGNMENT CORRECTION

(76) Inventor: Garry E. Clark, 106 Mulcaster Street, Barrie Ontario (CA), L4M 3M6

( * ) Notice: Subject to any disclaimer, the term of this patent is extended or adjusted under 35 U.S.C. 154(b) by 0 days.

(21) Appl. No.: 09/883,628

(22) Filed: Jun. 18, 2001

Related U.S. Application Data

(60) Division of application No. 09/563,125, filed on May 2, 2000, which is a continuation of application No. 09/165,601, filed on Oct. 2, 1998, now Pat. No. 6,065,735, which is a continuation-in-part of application No. 08/923,219, filed on Sep. 4, 1997, now abandoned.
(60) Provisional application No. 60/060,924, filed on Oct. 3, 1997.

(51) Int. Cl.[7] ............ F16K 31/05; H01M 63/32
(52) U.S. Cl. ............ 137/312; 251/129.03; 251/129.11; 251/292; 251/293; 340/604; 340/605; 429/118
(58) Field of Search ............ 137/312; 251/129.03, 251/129.11, 291, 292, 293; 340/604, 605; 429/52, 118

(56) References Cited

U.S. PATENT DOCUMENTS

| 801,012 A | 10/1905 | Howard |
|---|---|---|
| 1,322,979 A | 11/1919 | Waite |
| 1,387,715 A | 8/1921 | Hickman |
| 1,410,846 A | 3/1922 | Stewart |
| 1,931,751 A * | 10/1933 | Brown et al. ............ 251/293 X |
| 2,815,922 A | 12/1957 | Thomas et al. |
| 2,876,983 A * | 3/1959 | Martensson et al. ..... 251/292 X |
| 2,968,688 A * | 1/1961 | Skinner ................. 429/118 X |
| 3,515,250 A * | 6/1970 | Cantalupo .......... 251/129.03 X |
| 3,561,724 A | 2/1971 | Trombetta |
| 3,562,731 A | 2/1971 | Hsu |
| 3,687,415 A | 8/1972 | Turkot |
| 3,791,871 A * | 2/1974 | Rowley ....................... 429/118 |
| 3,845,788 A | 11/1974 | Laven |
| 3,864,676 A | 2/1975 | Macias et al. |
| 3,904,167 A | 9/1975 | Touch et al. |
| 4,131,133 A * | 12/1978 | Huwe ..................... 251/292 X |
| 4,136,823 A * | 1/1979 | Kulberg .................. 137/312 X |
| 4,246,575 A | 1/1981 | Purtell et al. |
| 4,256,030 A | 3/1981 | De Bruin et al. |
| 4,266,320 A * | 5/1981 | Grant .................... 251/293 X |
| 4,306,314 A | 12/1981 | Griffiths |
| 4,420,811 A | 12/1983 | Tarnay et al. |
| 4,421,832 A * | 12/1983 | Uba ....................... 429/118 X |
| 4,427,976 A | 1/1984 | Lord |
| 4,598,273 A | 7/1986 | Bryan, Jr. et al. |
| 4,629,157 A * | 12/1986 | Tsuchiya et al. ........ 251/291 X |
| 4,654,900 A | 4/1987 | McGhee |
| 4,691,727 A | 9/1987 | Zorb et al. |
| 4,790,514 A * | 12/1988 | Marks .................... 251/129.03 |
| 4,875,504 A | 10/1989 | Nicholson |
| 4,889,315 A | 12/1989 | Imanaga |
| 5,025,823 A | 6/1991 | Stevenson |
| 5,184,642 A | 2/1993 | Powell |
| 5,257,771 A | 11/1993 | Portis et al. |
| 5,399,445 A | 3/1995 | Tinker |
| 5,503,177 A | 4/1996 | Connelly |
| 5,547,164 A | 8/1996 | Ratnik et al. |
| 5,557,263 A | 9/1996 | Fisher et al. |

FOREIGN PATENT DOCUMENTS

JP      57-149686      9/1982

\* cited by examiner

*Primary Examiner*—John Rivell
(74) *Attorney, Agent, or Firm*—Kilpatrick Stockton LLP

(57) ABSTRACT

A retrofittable electric valve operating mechanism is provided which can be attached to an existing manual valve configuration while still allowing the manual feature of the valve to be utilized in two different manners. The configuration includes features which allow for certain misalignment of elements lying along the drive path, and can be installed without disturbing the existing plumbing associated with the valve.

19 Claims, 11 Drawing Sheets

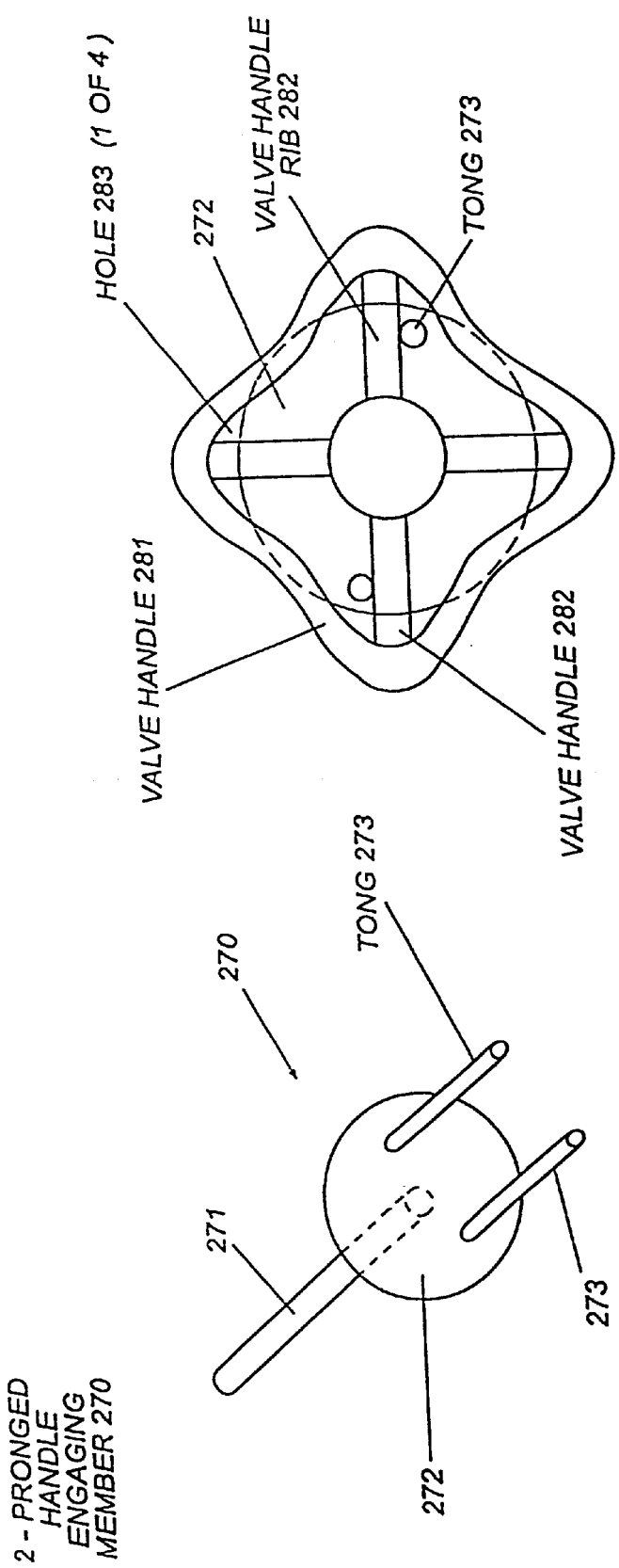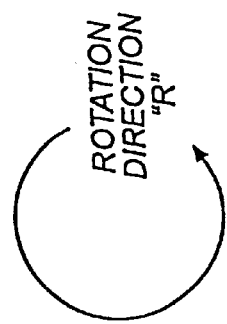

ELECTRIC VALVE UNIVERSAL RETROFIT CONFIGURATION HAVING MISALIGNMENT CORRECTION

CROSS REFERENCE TO RELATED APPLICATION

The present application is a divisional application of U.S. Ser. No. 09/563,125 filed May 2, 2000, which is a continuation of U.S. Ser. No. 09/165,601 filed Oct. 2, 1998, now U.S. Pat. No. 6,065,735, which is a continuation-in-part of U.S. Ser. No. 08/923,219 filed Sep. 4, 1997, now abandoned and claims the benifit of U.S. Ser. No. 60/060,924 filed Oct. 3, 1997.

RELATED APPLICATIONS

This application claims the benefit of my pending U.S. patent application Ser. No. 08/923,219, filed Sep. 4, 1997 (as a CIP thereof), as well as the benefit of my pending provisional application Ser. No. 60/060,024, filed Oct. 3, 1997.

TECHNICAL FIELD

This invention relates in general to valves, and particularly relates to an electric-drive valve configuration which can be retrofitted to an existing manual valve. In one configuration the valve can be manually operated in two different modes. A leak detection system is also provided.

BACKGROUND OF THE INVENTION

Damage done by water leaks causes millions of dollars of damage to buildings each year. The prior art includes leak detector systems to detect leaks and indicate them locally or remotely. To further enhance such detector systems a remotely operated valve is envisioned.

In a typical residential or small commercial water supply configuration, each building may include a manually operated water shut-off valve located in the incoming water line, hot water tank or other water lines. Although electrically operated valves are available, removing the existing manual shut-off valve and replacing it with a commercially available electrically operated valve incurs considerable inconvenience and expense, and when age of piping is a factor can involve the replacement of more than just the valve. Furthermore, in some instances such electrically operated valves cannot be manually overridden, which is desirable in the event of complete power failure or failure of the valve drive system.

Therefore, there is recognized a need in the art to provide a retrofittable electric valve operating mechanism which can be quickly and easily attached to an existing manual valve configuration while still allowing the manual feature of the valve to be utilized. A need also exists for an electric valve configuration which includes a certain degree of "slop" which can accommodate valve handle misalignment.

A need also exists for a valve operating system which can be used with a leak detection system.

SUMMARY OF THE INVENTION

The present invention overcomes deficiencies in the art by providing an improved retrofittable electric valve operating mechanism which can be quickly and easily attached to an existing manual valve configuration. The invention also provides an improved leak detection system.

Therefore it is an object of the present invention to provide an improved electric valve configuration.

It is a further object of the present invention to provide an improved electric valve configuration which includes a "universal joint" feature which accommodates some misalignment between the axis of rotation of the valve handle and the axis of rotation of the driving motor.

It is a further object of the present invention to provide an improved electric valve configuration which can be retrofitted to an existing manual valve.

It is a further object of the present invention to provide an improved electric valve configuration which can be retrofitted to an existing manual valve without disabling the manual valve's operation.

It is a further object of the present invention to provide an improved electric valve configuration which can be retrofitted to an existing manual valve without disassembling the manual valve.

It is a further object of the present invention to provide an improved electric valve configuration which can be retrofitted to an existing manual valve without the need for special tools.

It is a further object of the present invention to provide an improved electric valve configuration which can be retrofitted to an existing manual valve without special installation techniques.

It is a further object of the present invention to provide an improved electric valve configuration which can accommodate misalignment with the valve handle.

It is a further object of the present invention to provide an improved leak detection system.

Other objects, features, and advantages of the present invention will become apparent upon reading the following detailed description of the preferred embodiment of the invention when taken in conjunction with the drawing and the appended claims.

BRIEF DESCRIPTION OF THE DRAWINGS

FIG. 5 shows engagement of such a handle engaging member with a handle 211, having a plurality of ribs 212 and defining a plurality of holes 213.

FIG. 6 shows a two-prong handle engaging member 270.

FIG. 7 shows the handle engaging member 270 in rotating engagement with a valve handle 281 having a plurality of ribs 282 and defining four holes 283.

DETAILED DESCRIPTION OF THE PREFERRED EMBODIMENT

This description is made first in general and then in more detailed format, with like numerals designating like elements throughout the several views.

General Construction and Operation

Figure 1:
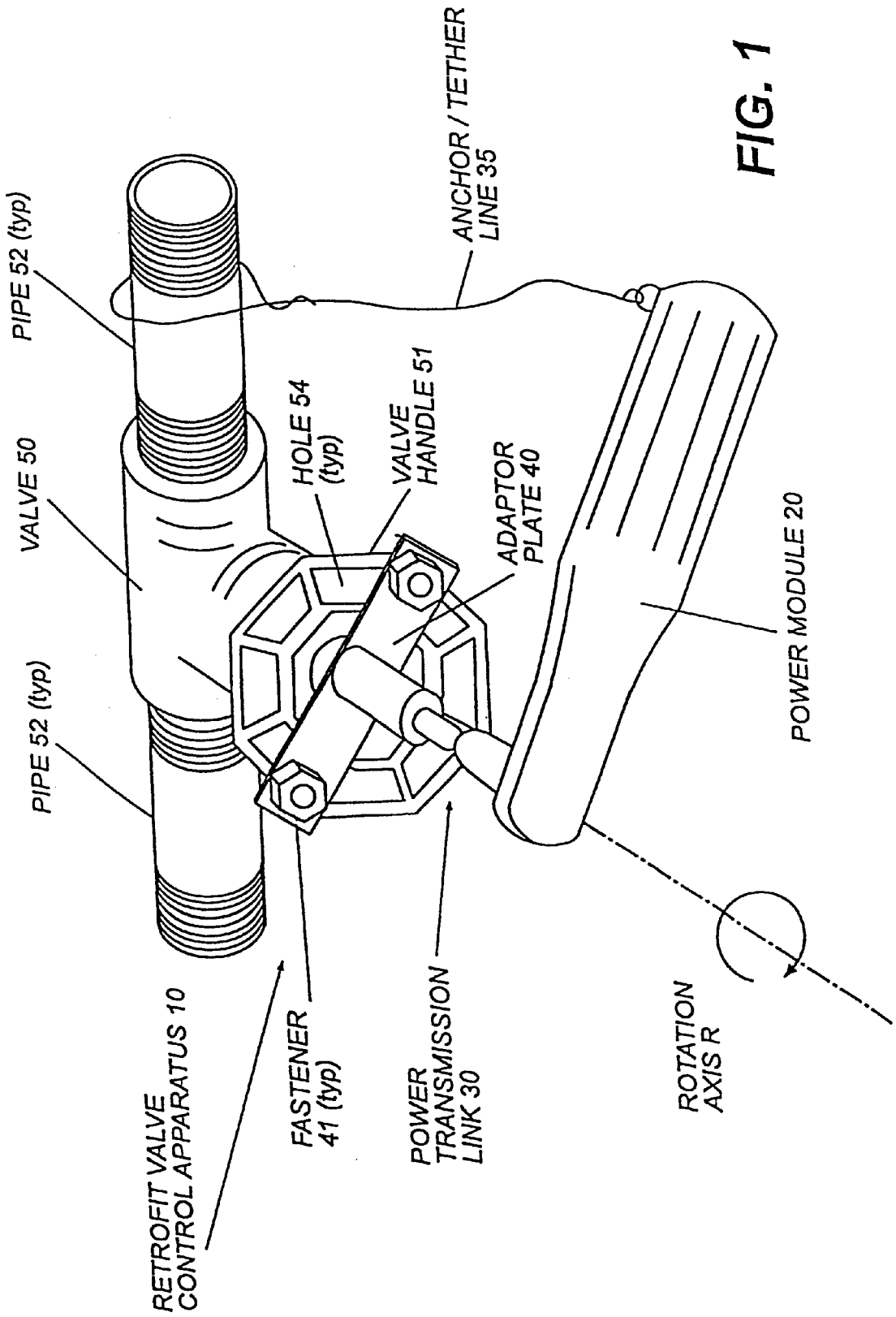
FIG. 1 is a pictorial view of a retrofittable valve control apparatus 10 attached to a conventional manually operable valve 50 which controls fluid flow through typical piping 52.
Figure 2:
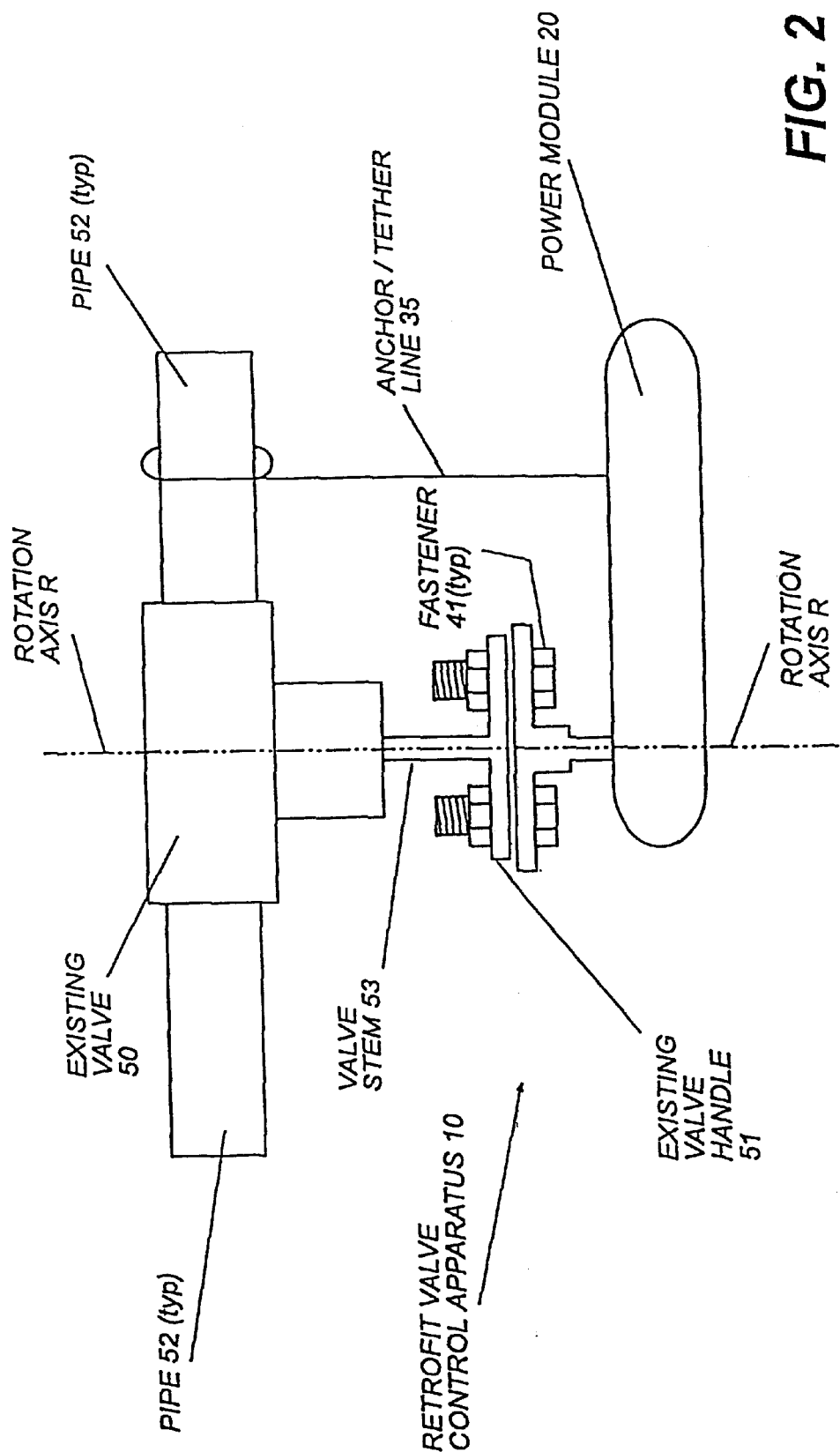
FIG. 2 is a top plan view of the retrofittable valve control apparatus 10 attached to a conventional manually operable valve 50 which controls fluid flow through typical piping 52 as shown in FIG. 1.

Referring first to FIGS. 1 and 2, the existing manually operable valve 50 is converted to electric operation by use of a retrofit valve control apparatus 10 including a power module 20, power transmission link 30, an adapter plate 40, and a tether line 35. The power module 20 provides power through the power transmission link 30 to the adapter plate 40, which causes rotation of the adapter plate 40 relative to the power module 20. As the power module 20 is tethered relative to a stationary object, this causes rotation of the valve handle 51.

The Existing Valve

The present invention is used in conjunction with an existing water or other fluid valve 50. The existing water valve 50 includes a handle 51 which is attached as known in the art to a valve stem 53 which, upon proper rotation about its longitudinal axis, causes a valve member (not shown) inside the valve housing to be opened or closed, depending upon the direction of rotation of the stem 53. The handle 51 of the water valve 50 is configured to be grasped by the hand of a human being and twisted to cause the valve member to move as discussed above.

Many valve handle configurations include a plurality of holes 54 therein such as those shown in FIG. 1. These holes 54 are used to attach the adapter plate 40 thereto as discussed in detail below.

The Mounting Bar and Its Fasteners

The adapter plate 40 is attached to the existing manual valve handle 51 by fasteners 41, preferably by an attachment scheme that allows quick and easy attachment.

The fasteners 41 can be bolts as shown or spring clips (not shown) that attach to the existing holes 54 in the valve handle 51. However, they should preferably allow some movement to compensate for misalignment and slack to allow initial movement of the adapter bracket 40 to develop a slight bit of momentum to jar the valve into turning.

The Power Transmission Link

The power module 20 is connected directly to the adapter plate 40 (a.k.a. adapter bracket) by means of a power transmission link 30. FIG. 2 shows the power transmission link as a single member for purposes of clarity, but as noted above a detachable connection can be used to allow the adapter plate (being part of the transmission link) to be first attached to the existing valve handle without requiring immediate attachment of the power module 20.

The power transmission link 30 also could include a universal joint or flex shaft (not shown). This would allow the position of the power module 20 to be altered in case it cannot be positioned parallel to the existing pipe or wall. However, as noted elsewhere in this application the power module 20 must be secured enough to provide torque sufficient to turn the valve stem (either directly or through an attached handle).

The Power Source

The power module 20 could be powered by household power or it could be battery operated. The preferred method is battery operated. In one embodiment the device is adapted from a hand-held power screwdriver, and it is believed that the power of such a device would be suitable, if used with the proper gear reduction ratio. Under one embodiment, a device would operate at 30 to 200 RPM preferably near the 30 RPM range. It would have 100 to 300 inch pounds of torque. The device should be allowed to "freewheel" rotate without power, or to lock, so it can be used in a manual manner without electrical power.

The housing of the power module 20 can contain the batteries if used and the remote control logic used to control the electric valve operation.

The drive configuration shown in FIGS. 1 and 2 could be considered a "90 degree" configuration which results in the power module having a reversibly rotatable output shaft having an axis of rotation which is 90 degrees in relation to the longitudinal axis of the motor (not shown) within the elongated power module 20. However, as discussed below, other configurations are contemplated without departing from the spirit and scope of the present invention.

The purpose of the angle drive is to allow the elongated body of the power module 20 to preferably run parallel to the existing pipe 52. In the event that the power module 20 cannot be installed in this position, it could be placed in any position that will provide ease of installation.

The Anchor or Tether Member

As may be understood, torque is imparted upon the valve by the apparatus 10 to cause it to turn. In order to counteract said torque, an anchor or tether line 35 can be used to hold the power module 20 in place.

The tether line 35 could be attached to the case of the power module 20 and could consist of a cord, wire, or other suitable strong material. The tether line 35 could be attached between the power module 20 and the existing pipe 52, or alternately to another nearby object as shown in FIG. 3.

Alternate Configurations

Figure 3:
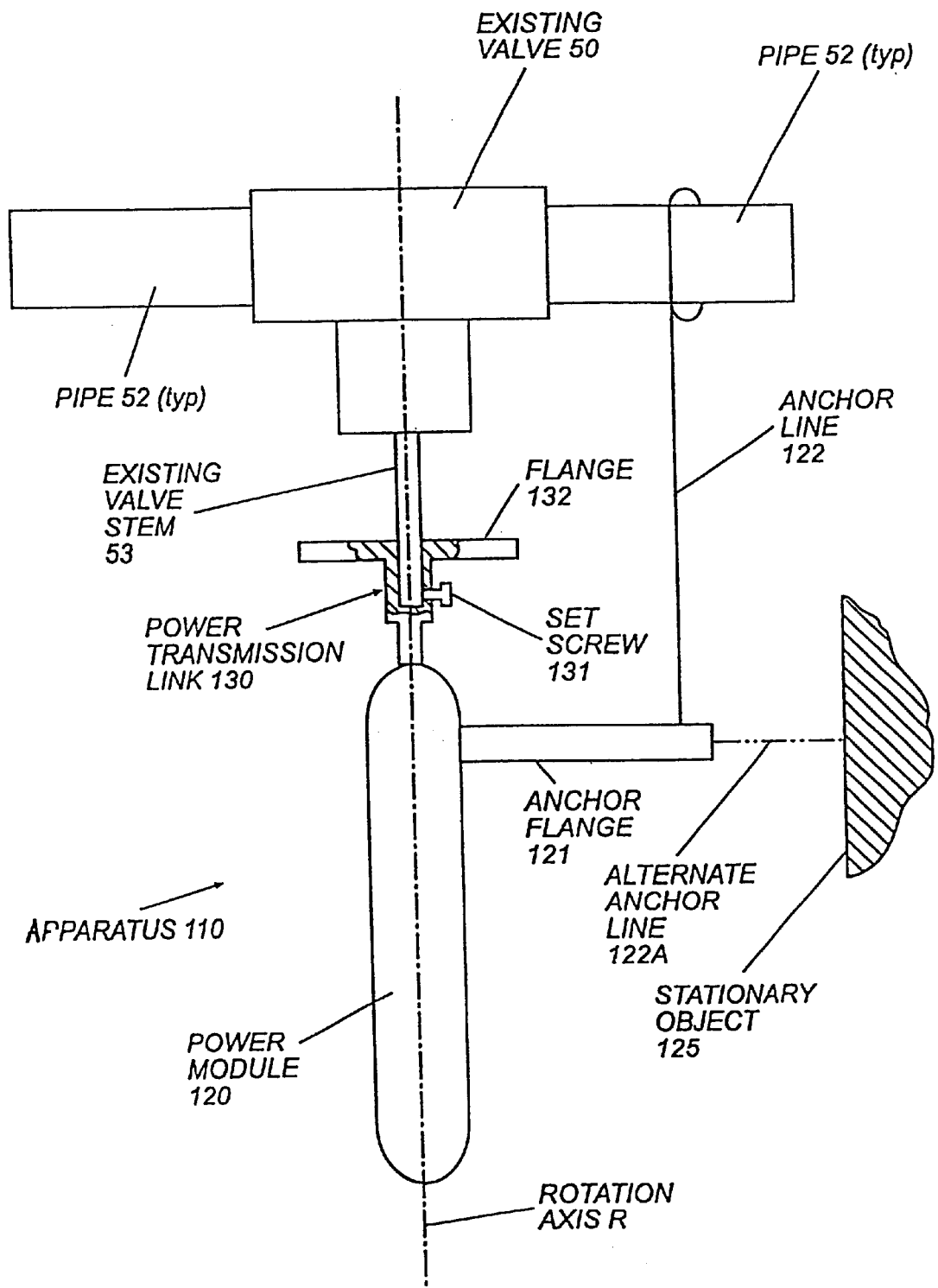
FIG. 3 is a top plan view of an alternate retrofittable valve control apparatus 110 which includes an alternate power module 120 driving the splined stem 53 of a valve 50 through means of an alternate power transmission link 130.

Reference is now made to FIG. 3, which discloses an alternate retrofittable valve control apparatus 110 comprising a second embodiment of the invention which includes an alternate power module 120 which drives a splined stem 53 of a valve 50 through an alternate power transmission link 130.

The alternate power transmission link 130 is directly driven by the power module 120 and any of its internal power transmitting gears (not shown). The transmission link 130 includes an adapter bracket portion defining splined bore which accepts a splined valve stem 53 such as shown in FIG. 3. Such splined valve stems are commonly used to accept the handles 51 as discussed above.

As may be noted, in the configuration shown in FIGS. 1 and 2, the handle 51 was used to mount the retrofit valve control apparatus 10. However, in this configuration, the handle is first removed, exposing a valve stem 53. As may be understood, such valve stems can typically be splined to prevent rotation of the handle 51 relative to the stem 53. A set screw 131 can be used to secure the splined connection.

The alternate power transmission link 130 includes the splined bore and a pair of oppositely oriented grasping flanges 132 which allow a user to manually grasp the flanges 132 to cause rotation of the valve stem 53 by simply manually rotating the powered transmission link 130.

In the configuration shown in FIG. 3, a tethering or anchor flange 121 is set at 90 degrees from the body of the elongated drive mechanism. The anchor flange 121 can be attached to a solid foundation by an anchor line 122 or 122A so as to prevent the drive mechanism from turning as the valve is being closed.

As another alternative, a tether could be connected to a weight (not shown). The weight, acted upon by gravity, would act to hold the drive mechanism in a downward position.

Third Embodiment

Reference is now made to FIGS. 4–7 which show a third embodiment of the invention including an apparatus 200.

General Construction and Operation

Figure 4:
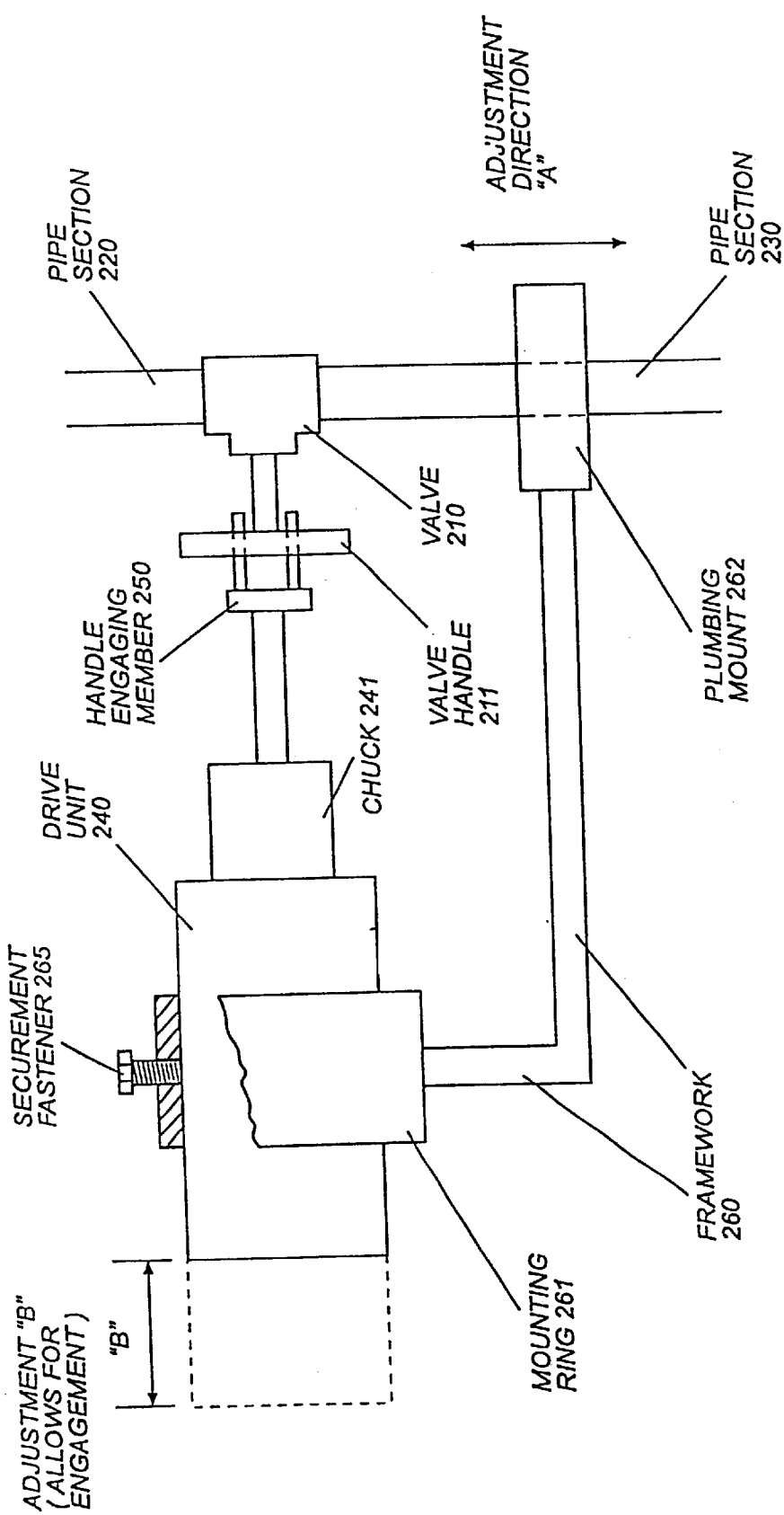
FIG. 4 is a side elevational view of an apparatus 200 according to a third embodiment of the present invention.

FIG. 4 shows an apparatus 200 as used in connection with a manually-operable water or other fluid valve 210 having a handle 211, the water valve configured to selectively provide a valving function between pipes 220 and 230.

The apparatus 200 generally includes an adjustable motorized drive unit 240 (a.k.a drive "motor"), a handle engaging member 250, and a drive unit support framework 260. The drive unit support framework 260 provides a rigid supporting connection between the existing plumbing (e.g. pipe section 230) and the body of the drive unit 240. This allows the drive unit 240 to rotatably drive the handle engaging member 250 such that the handle engaging member 250 similarly rotatably drives the valve handle 210, to turn the valve on or off.

The Frame

As noted above, the drive unit support framework 260 provides a rigid supporting connection between the existing plumbing (e.g. pipe section 230) and the body of the drive unit 240. The drive unit support framework 260 is substantially rigid, and includes a drive unit mounting ring 261, and also includes a plumbing mount 262.

The drive unit mounting ring 261 is configured to releasably accept the cylindrical body of the drive unit, and includes a securement fastener 265 which is threadably engaged with the drive unit mounting ring 261. Adjustment of this securement fastener 265 allows the body of the drive unit to be adjusted along its longitudinal axis (to allow for tongs/hole engagement as described in detail later) as well as to be adjusted by rotation about its longitudinal axis. After adjustment the securement fastener 265 is tightened down to secure the cylindrical body of the drive unit relative to the framework 260.

The plumbing mount 262 is configured to releasably mount the drive unit support framework 260 relative to existing plumbing. In the figure shown, the mount is clamped to pipe section 230. As the pipe section 230 is also cylindrical, adjustment of the plumbing mount 262 relative to the pipe section 230 can be made along longitudinal axis of the pipe section 230 as well as about the longitudinal axis of the pipe section 230, prior to securement of the plumbing mount 262 to the pipe section 230.

Figure 9:
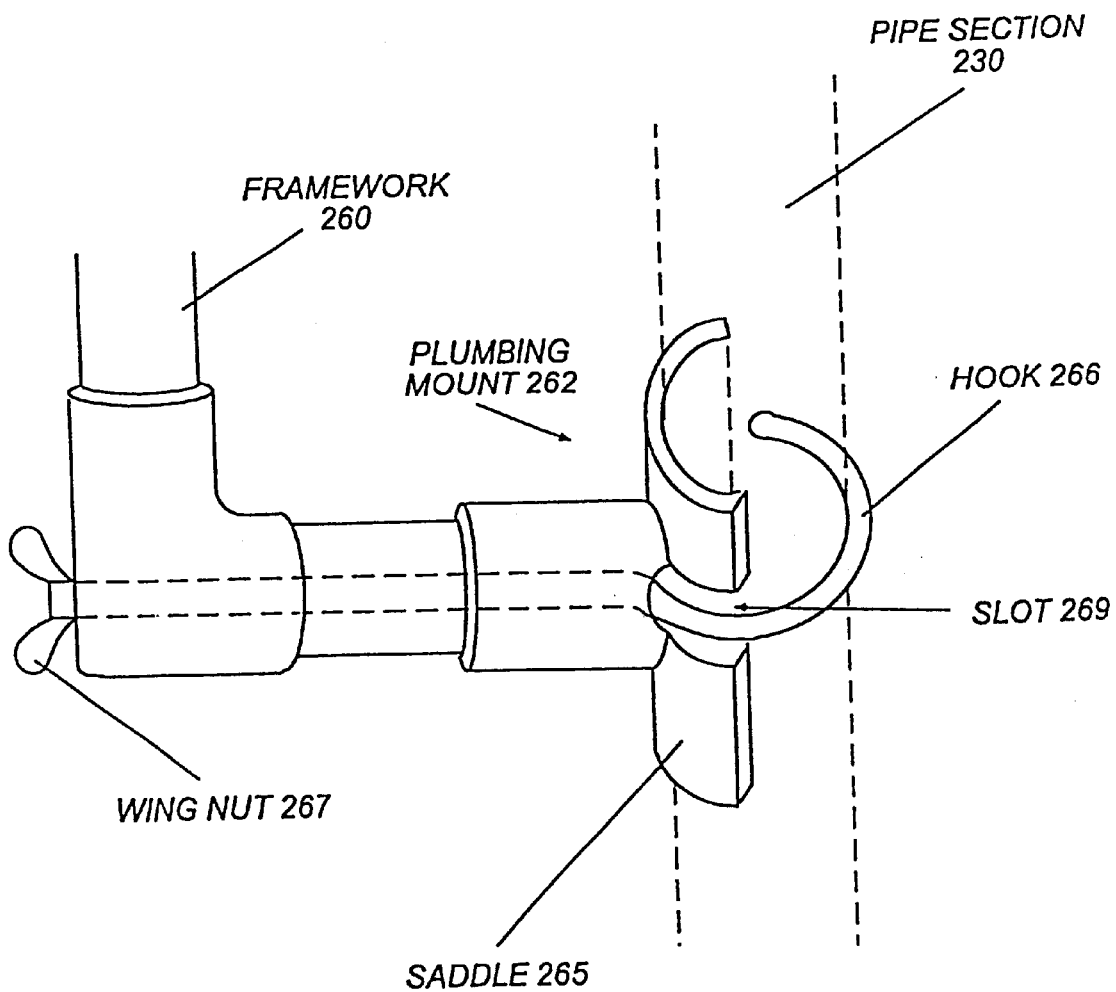
FIG. 9 shows a more detailed view of one manner of attaching the framework 260 to the pipe section 230.

FIG. 9 shows a more detailed view of a plumbing mount 262 according to the present invention. Under this configuration a "T"-shaped PVC pipe member is modified by cutting its "T" portion to provide a saddle 265 which cradles the pipe section 230. The base of the "T" section is attached to the remainder of the framework 260 A hook member 266 hooks around the pipe section, passes through an open-ended slot 269 in the modified "T"-member and then passes through the tubular (in one configuration PVC) framework, until it passes out a hole in an elbow of the framework and has its other, threaded, end captured by a wing nut 267. By tightening the wing nut 267, the hook is tightened against the pipe section 230, thus attaching the framework thereto.

The Motor

Referring back to FIG. 4, the drive unit 240 is substantially elongate and has a chuck 241 configured to selectively accept a separate elongate member (such as a stub shaft) and rotate said member about it longitudinal axis. In one preferred embodiment, this drive unit can be a lightweight hand-held electric screwdriver, such as a SKIL #2106.

The drive unit 241 includes a body portion which is substantially cylindrical, to allow said body to slide within a mounting ring 261 defined by the framework as discussed in further detail later.

The Handle Engaging Member 250 (a.k.a. Engaging Head")

Figure 5:
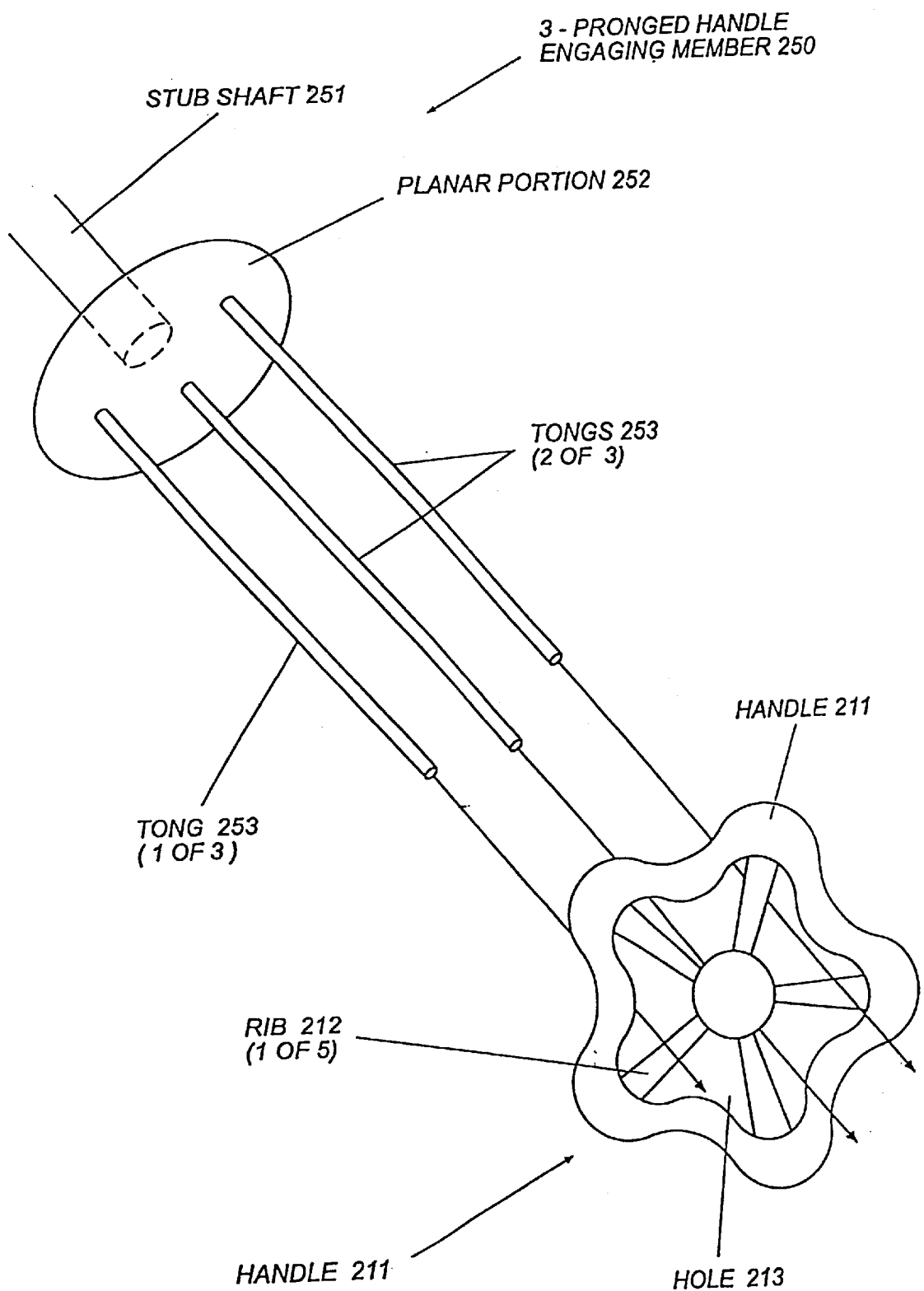
FIG. 5 is an isolated view of a three-pronged handle engagement member 250, which includes a stub shaft 251, a planar portion 252, and three tongs 253.

Referring to FIGS. 4 and 5, the handle engaging member 250 (a.k.a. an engaging head) is configured to be driven by the drive unit 240 much as would a drill bit or screwdriver bit. The handle engaging member 250 is interchangeable with other handle engaging members (e.g., member 270) as well as a drive member 400 (see FIG. 8B) to allow the overall apparatus to be adaptable to different valve handle configurations.

The handle engaging member 250 includes a stub shaft 251, a disk-shaped planar portion 252, and a plurality of engaging tongs 253. One face of the planar portion 252 is attached to one end of the stub shaft 251, such that the primary planar surfaces of the planar portion 252 are substantially normal to the longitudinal axis of the stub portion 251.

The tongs 253 are elongate and rod-like, and have substantially coparallel longitudinal axes which are also parallel to the longitudinal axis of the stub shaft 251. One end of each of the engaging tongs 253 is attached to one common planar side of the planar portion 122, such that the engaging tongs extend from said planar portion in one direction, and said stub shaft 251 extends in an opposite direction from said planar.

FIGS. 5 and 6 show two different engaging tong configurations. FIG. 5 shows a "three tong" design, which can be used to engage certain types of valve handles 211, with the elongate tongs passing through holes 213 in the valve handle, and engaging the ribs 212 upon rotation.

FIG. 6 shows a "two-tong" design, which can be used with other certain types of valve handles as shown in FIG. 7, namely handles such as 281 having ribs 282 and holes 283.

In both the FIGS. 5 and 6 configurations the tongs can be ⅛" in diameter and 2" long, as an example only.

Other multi-tong configurations are contemplated under the present invention; one offset tong has been found to "bind" unacceptably. It has been found that the use of two or more tongs allows the system to function suitably without the use of high strength members. The use of tongs members on either side of the rotational axis tends to "balance out" forces on the valve handle.

Installation and Engagement

In order to install the apparatus 200 according to the present invention, the plumbing mount 262 of the framework 260 is first attached to a pipe section such as 230 shown in FIG. 4. Adjustment is made along direction "A", as well as by rotation about the longitudinal axis of the pipe section 230 in order to get the handle engaging member 250 preferably aligned with the stem of the valve 210, such that the rotational axis of the handle engaging member 250 is substantially coaligned with the handle 211 of the valve 210. The securement fastener 265 is then loosened to a degree to allow the drive unit 240 to be slid along its longitudinal axis as shown by adjustment "B". Such adjustment allows the tongs of the handle engagement member 250 to loosely fit in the holes in the valve handle 211, such as shown in FIG. 5. When the handle engaging member 250 is suitably positioned relative to the valve handle 211, the securement fastener 265 is tightened down.

Controls and Operation

The apparatus 200 according to the present invention can include control features which allow the drive unit 240 rotate in one direction upon a particularly signal, and then to be stopped after a timer times out. Upon receiving a second signal, the drive unit can reverse for a certain period of time, and then stop after timing out. The timeout period can be six seconds.

When the drive unit is turned on and rotates, as may be seen the tongs eventually engage the ribs or other similar parts of the handle. In the case of the FIG. 5 configuration, the tongs 253 contact the ribs 212. In the case of the FIG. 6 configuration, the tongs 273 contact the ribs 282.

When the tongs of an engaging member are contacting and driving a valve handle, it may be understood that the rotational axis of the engaging member 250 may be misaligned (either at an angle to or offset from) with the rotational axis of the valve handle. However, even in the cases of relatively severe misalignment the tongs can still drive the ribs, by allowing some "sliding" therebetween. This has been termed by the inventor as a "sliding universal joint" feature, and is an important part of the invention. This sliding can be parallel to the rotation axis (in the case of angular axis misalignment) or can be radial sliding (in the case of offset axis misalignment).

Advantages

The motor/connecting tool position is adjustable for different valve stem lengths.

As may be understood, there is a certain degree of "slop" provided between the tongs and the valve handles. This is by design, and allows for some misalignment between the apparatus and the valve handle. This configuration has been found to accommodate up to a thirty (30) degree misalignment between the rotational axis of the valve handle and the rotational axis of the tongs/drive member/drive unit. This concept could also be referenced to as a "sliding universal joint" configuration.

Alternative Drive Unit Mount

Figure 10:
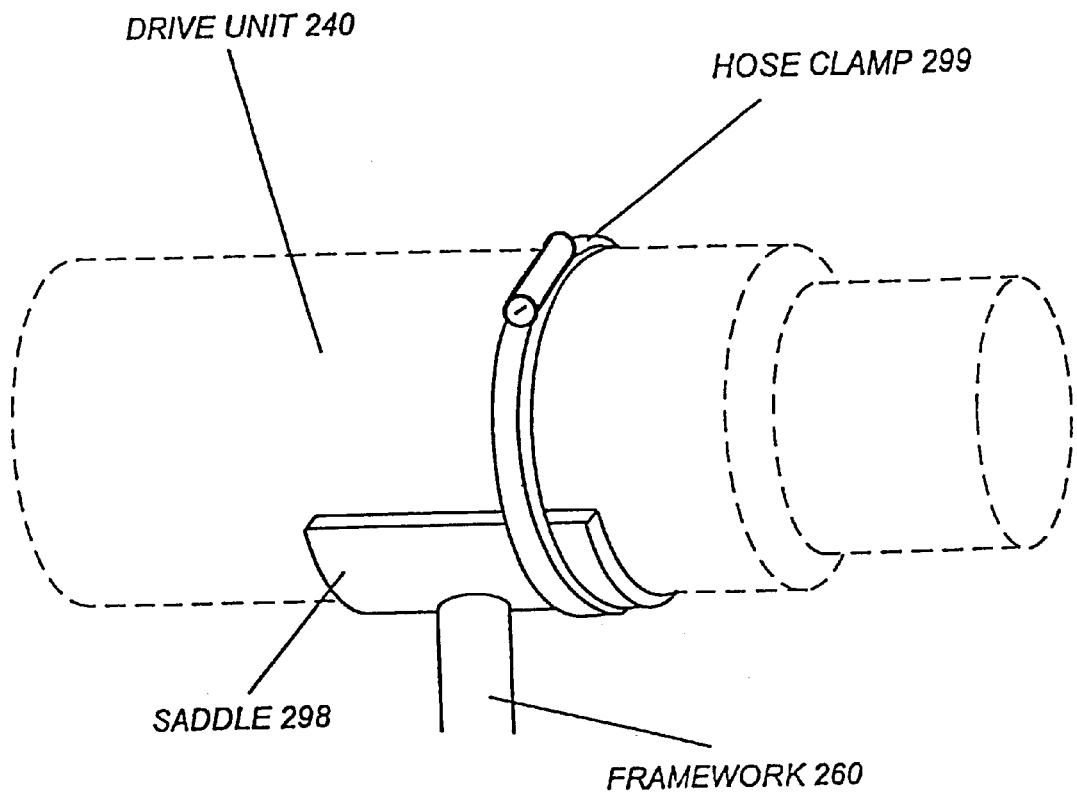
FIG. 10 shows an alternative drive unit mount according to the invention.

Reference is briefly made to FIG. 10, which shows an alternate means for mounting the drive unit 240 relative to the framework 260. A "saddle" 298 can be provided by cutting a "T" member as described above, and clamping the drive unit 240 to the saddle by means of a hose clamp 299. Adjustment of the position of the drive unit 240 is similar to that described above.

Fourth Embodiment

Figure 8A:
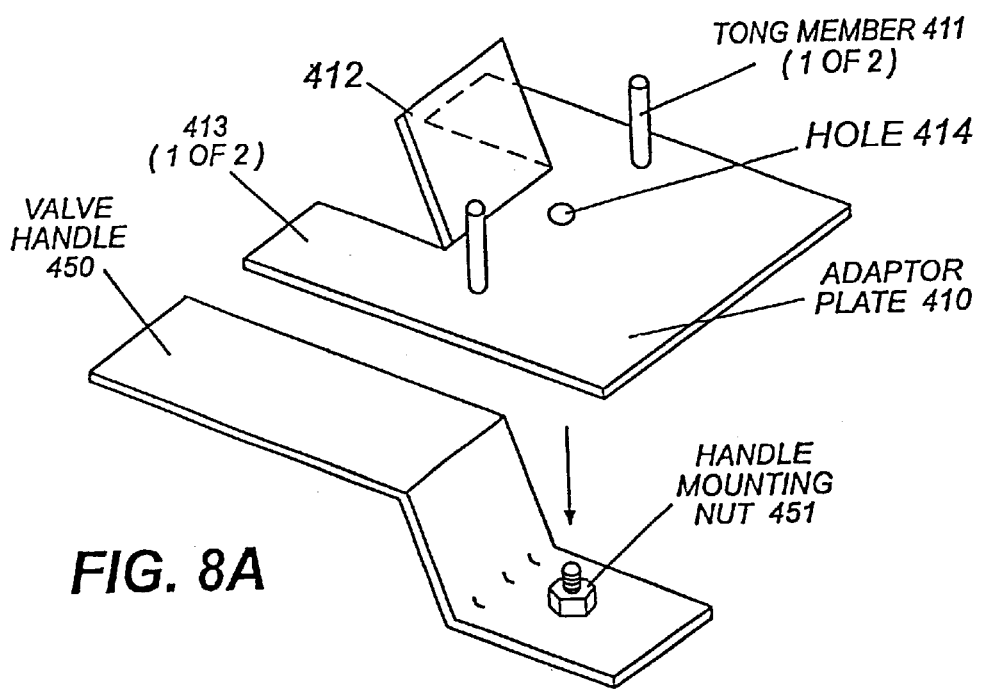
FIGS. 8A and 8B show sequential assembly steps of an apparatus 400, in which an adaptor plate 410 is attached relative to a valve handle 450 as shown in FIG. 8A, and a drive member 420 is attached to the adaptor plate 410 in FIG. 8B.
Figure 8B:
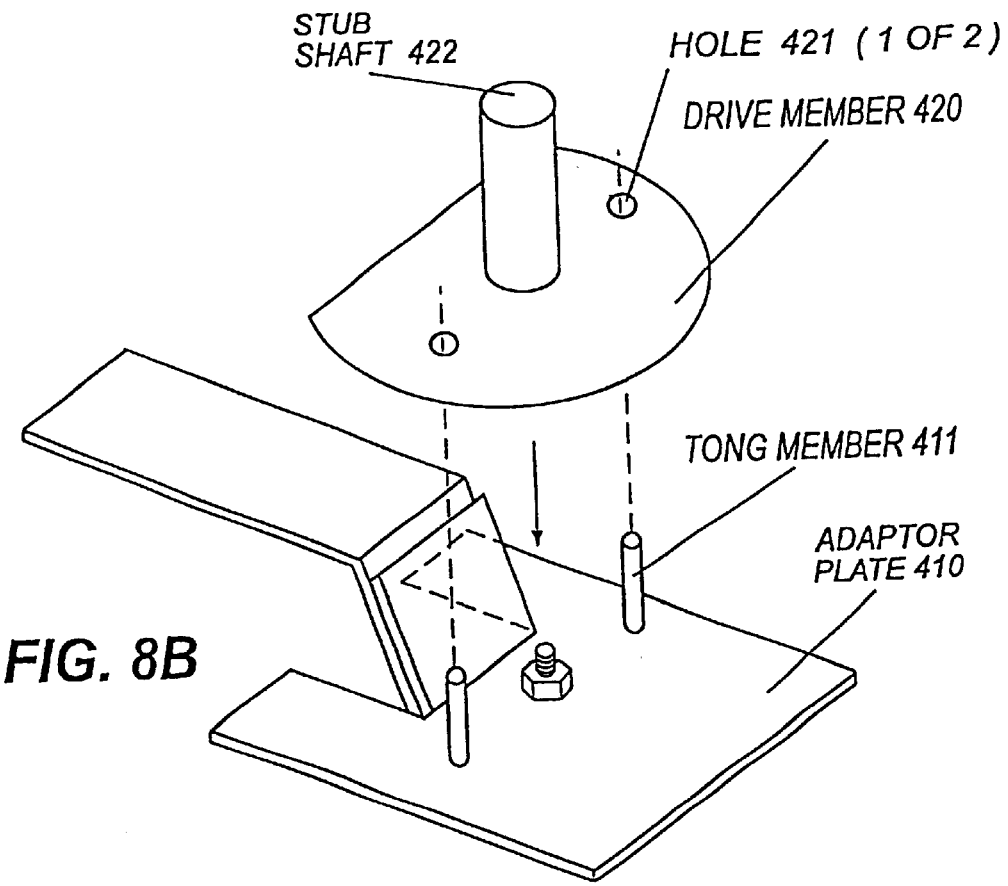

Reference is now made to FIGS. 8A and 8B which show a third embodiment of the invention, being an assembly referenced generally as 400. This assembly includes an adaptor plate 410, a driving member 420 and various fasteners.

Generally described, the adaptor plate 410 is attached relative to an elongate valve handle such as 450 (which may be recognized as a handle often used in natural gas valves). Therefore it may be seen that the adaptor plate rotates with the valve handle.

A driving member 420 having a stub shaft 422 is configured to engage the adaptor plate by a tong/hole interaction similar to that described above. The stem member 422 of the driving member can be driven by a drive motor such as 240 described above, held in place by a framework such as described above.

As in the previous embodiment, tongs 411 extending from the adaptor plate 410 loosely extend through holes 421 defined by the drive member. A loose fit between these tongs (e.g., ⅛" diameter) and holes (e.g., ¼" diameter) accommodates misalignment between the rotational axis of the adaptor plate 410 and the rotational axis of the valve handle 450, providing a "sliding universal joint" similar to that previously described.

The valve handle 450 is attached to the stem of a typical valve (not shown) by a nut 451, and is as known in the art.

The adaptor plate 410 includes a platelike body and a pair of tong members 411 extending from one side of the platelike body. The platelike body includes a bent-up flange 412 and pair of side flanges 413. The bent-up flange 412 is bent as shown in FIG. 8A to accommodate part of the valve handle 450, such that the two side flanges 413 can fit on either side of the valve handle 450 and engage and drive the valve handle 450 when attached thereto.

The drive member 420 includes a planar body from which extends an elongate stem member 422. The planar body includes a pair of through holes 421 configured to accept the elongate tongs 411 of the adaptor plate 410. Tong/hole engagement is provided by the adjustment "B" shown in FIG. 4.

To attach the assembly 400 relative to the valve handle 450, the adapter plate 410 is first attached relative to the valve handle 450. The drive member 420 is then engaged with the adapter plate 410.

The adapter plate 410 is attached relative to the valve handle 450 by first removing the nut 451 securing the valve handle 450, passing the valve stem through the hole 414 of the adaptor plate, and then reattaching the nut 451 to the valve stem.

As noted above, a loose fit between the threaded members 411 of the adaptor plate 410 and the holes 421 of the drive member 420 provides some 'slop" to accommodate some misalignment between the rotational axis of the adaptor plate 410 and the rotational axis of the valve handle 450, to provide the "sliding universal joint" feature.

Therefore it can be understand that by inserting the stub shaft 422 into the chuck of the drive member 240, and attaching the adaptor plate 410 to a valve handle 450, the valve handle can be rotated as desired by the drive member 240.

It may be understood that the present invention contemplates the use of a "kit" which can be sold as a unit. This kit could include the configuration shown in FIG. 4 (without the valve and pipe sections), and would also include the engaging member 270 of FIG. 6 as well as the members 410 and 420 of FIGS. 8A and 8B. the consumer would purchase

Operation With Other Devices

As noted above, the apparatus according to the present invention is one intended use of with a leak sensing means configured to provide an automatic signal upon the sensing of a water leak. This signal can be used to cause the apparatus according to the present invention (typically at some remote location) to activate, thus turning the water off and minimizing further damage. Such remote operation may be provided by use of RF or other suitable wireless communication, or can be controlled by "hard wire" means.

Damage done by water leaks cause millions of dollars of damage to building each year. Some of these leaks could occur within walls and other locations that are not readily accessible. A leak detector system using electronic circuits is proposed to detect leaks and indicate them locally or remotely. To further enhance the detector system a leak activated battery is proposed.

Primary (dry cell) batteries have been used for years to power electronic circuits such as may be used in the proposed leak detector system. These batteries are generally ready to be put into service without any other function then to insert them into the battery holder of the equipment that it is going to power. The term (dry cell) is misleading because the battery electrolyte must be moist to have the battery supply electric current.

This feature of being ready to be put into service causes the ordinary dry cell to have a definite shelf life. Because the battery electrolyte is moist internal electric current losses within the battery causes it to deplete the elements used to generate the electric current that the battery is to provide. If the battery was used to power a hot water tank leak detector it may be ten (10) years or more before the tank may leak. Because of the internal losses and the power it would take to operate the detector electronic circuits during that time several batteries would have been needed to keep the detector device operating.

Due to the above condition and to ensure that the dry cell is able to perform its intended function, electronic circuits are used that monitor the battery. This circuit is designed to provide an alarm when the battery starts to weaken and is reaching the end of its useful life. The alarm is intended to indicate that the battery should be replaced so that the leak detector will continue to function as intended.

A different type of primary battery is known as a "reserve battery". A reserve battery is one that is inert until an operation is performed that causes the electrolyte to become moist. This is usually done by a person pouring water or electrolyte into the battery or actually putting the battery underwater. An important design consideration of this type of battery is to ensure that the electrolyte is delivered as quickly as possible at the time of activation while avoiding chemical short-circuiting of the cells. This type of battery is generally used in applications were high output current is needed for a short period of time (minutes of operation). The leak detector circuit according to the present invention requires minimum power.

Figure 11:
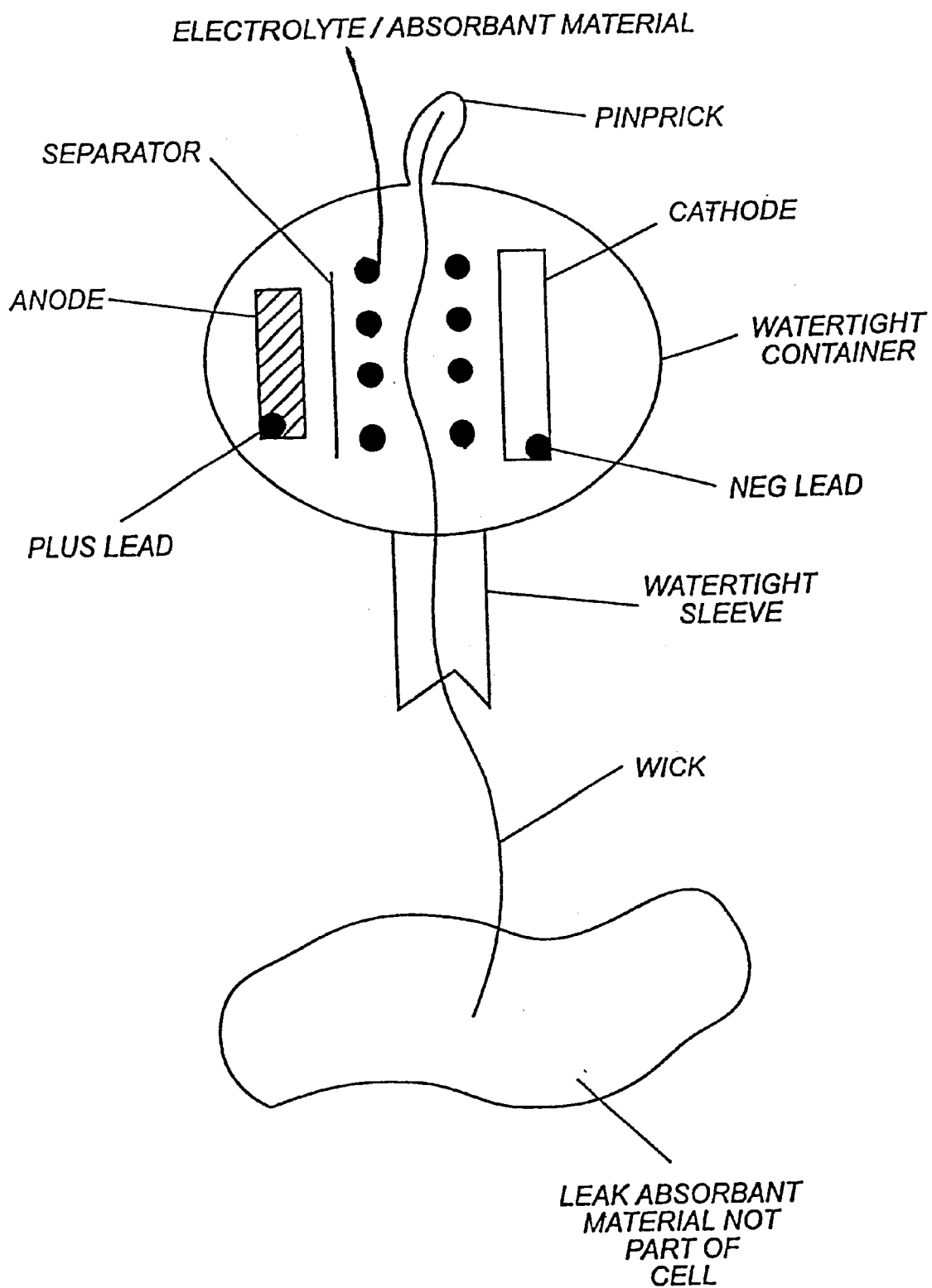
FIGS. 11 and 12 relate to a leak activated warning system which may be used with any of the four above embodiments.

Referring to FIG. 11, the basic parts of a Leak Activated Cell according to the invention is shown. This cell consists of an Anode, Electrolyte/Absorbent material, Cathode, water tight container and sleeve, electric leads and Wick. The anode, electrolyte and cathode would consist of normally used elements that make up dry cell batteries. The wick would consist of ordinary wicking material while the water tight container and sleeve would consist of a plastic material. The positive lead and negative leads protrude through the air tight container and would consist of materials normally used for this purpose.

The electrolyte would normally be in the dry state. This feature allows the cell to have a very long dry life cycle. The cell could be deployed in an area that is to be monitored for water leaks. It would last for a very long period of time remaining ready to supply an electric current to the detector system when a water leak occurs.

When a leak occurs and the leak absorbing material (such as paper toweling, not part of cell) is wetted in sufficient quantity to allow the wick to get wet the cell will start to produce an electric current when the water in the wick causes the electrolyte to become wet. The water tight container and sleeve allow the water to enter the cell in only one place.

The wick protrudes through the water tight container into a cavity. The cavity would have a pinprick in it. The pinprick will allow air to escape when the wick was soaking up water while at the same time deter water from escaping from the cavity. Thus one end of the wick absorbs water while the other end allows trapped air to escape until the wick has been wetted right through the electrolyte/absorbing material.

The absorbing material could consist of the natural material psyllium. This material absorbs the water from the wick, swells up and eventually causes the cell cavity between the anode and cathode to be filled. This will then cause the wick to stop conducting water into the cell and also plug the opposite exit hole. The water trapped in the psyllium would be used to keep the electrolyte material moist. The separator material and placement would be similar to that used in ordinary dry cells.

Figure 12:
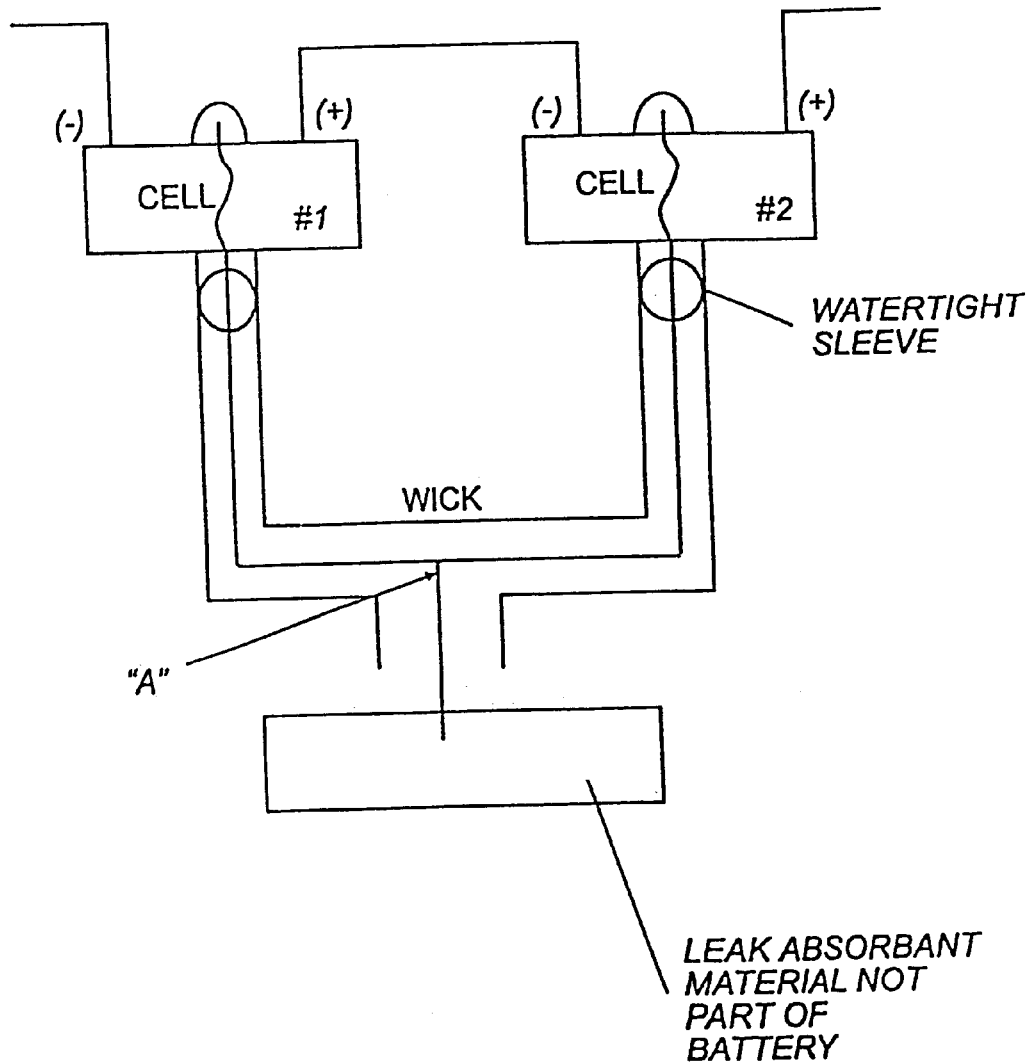

Referring to FIG. 12, a leak activated battery is shown. The battery could consist of two or more leak activated cells. The wick arrangement allows each cell to be wetted in about the same amount of time. This ensures that each cell in the battery is able to provide its share of the electric current needed. A water tight sleeve prevents the wick from being wetted at any other point except where the wicks from each cell meet the leak absorbing material, point "A" on the drawing.

To prevent chemical short circuiting of the cells in a battery, the length of the wicks are sufficient in length to prevent enough electrolyte from flowing out of the cell. Also the water absorbent causes the water in each cell to be trapped and held. Also the absorbent will swell up causing the water tight container to be filled preventing any more water from entering it through the wick.

Materials

Conventional materials may be used to provide the various elements of the present invention.

Conclusion

Therefore it may be seen that the present invention provides an improvement over the known prior art by providing a retrofittable electric valve operating mechanism which can be attached to an existing manual valve configuration while still allowing the manual feature of the valve to be utilized. The configuration includes features which allow for certain misalignment of elements lying along the drive path, and can be installed without disturbing the existing plumbing associated with the valve.

An important feature of the present invention is that the power transmission may be manually "overridden" by simply rotating either the handle 51 of the valve 50 (causing the motor within the power module to "freewheel", or by disengaging the tether from its attachment to the pipes 52 or other stationary object, and rotating the entire power module about the rotational axis "R" of the valve 50. In this second "overriding" configuration, the power transmission link must be locked to prevent rotation of the central shaft (and the motor), in a manner similar to the "locking" of a hand-held power screwdriver when a screw is to be manually driven without the use of electrical power.

Another important feature of the present invention includes the provision of a "sliding universal joint" feature which accommodates even gross misalignment as described above.

While this invention has been described in specific detail with reference to the disclosed embodiments, it will be understood that many variations and modifications may be effected within the spirit and scope of the invention as described in the appended claims.

What is claimed is:

1. A device for sensing a leak comprising:
   a. a cell comprising an electrolyte stored within said cell in a dry state;
   b. a wick arrangement having one end for receiving moisture and another end for dispersing said moisture to said electrolyte, whereby when said moisture receiving end is wetted by said leak, said moisture transmits along to said moisture dispersing end;
   c. an anode and a cathode combination positionally separated adjacent said electrolyte, said moisture mixing with said electrolyte when said wick arrangement is wetted; and d. said electrolyte upon being wetted, forms an electric current to flow between said anode and cathode.

2. The device of claim 1 further comprising:
e. a water tight container for housing said anode, said cathode, said electrolyte and said moisture dispersing end of said wick; and
f. said moisture receiving end of said wick extends from and is disposed outside of said container, and said moisture being capable of reaching said electrolyte only via said wick arrangement.

3. The device of claim 2 further comprising:
g. a sleeve extending from said container, said moisture receiving end of said wick being disposed within said sleeve and extending from said sleeve.

4. The device of claim 1 further comprising:
e. a water tight container for housing said anode, said cathode, said electrolyte and said moisture dispersing end of said wick; and
f. a sleeve extending from said container, said moisture receiving end of said wick being disposed within said sleeve such that an interior of said container and an interior of said sleeve being in fluid communication with each other.

5. The device of claim 1 further comprising a valve operatively associated with said device and said valve further being operative to close upon receiving said electric current from said cell, whereby when said device detects said leak, said valve is closed.

6. The device of claim 5 wherein said valve is a manual valve having a valve stem, said stem having a longitudinal rotational axis, and wherein said device further comprises a retrofit valve control apparatus for providing electrical control of said manual valve and being operatively associated with said manual valve and said device, said retrofit valve control apparatus comprising:
a power module for receiving said electric current, said power module including a body and a drive shaft rotatable relative to said body, said shaft being electrically rotatably driven relative to said body in response to said electric current; and
an adapter bracket coupled to said drive shaft of said power module;
means for attaching said adapter bracket relative to said valve stem of said manual valve such that rotation of said adapter bracket causes rotation of said valve stem; and
said valve stem being rotated by energizing said power module causing said shaft of said power module to rotate relative to said body of said power module and said energizing of said power module causing said valve to close.

7. The device of claim 6 wherein said retrofit valve control apparatus further comprises:
stop means for securing said body of said power module relative to a stationary object; and
means for locking said shaft of said power module relative to said adapter bracket such that said stop means may be detached from the stationary object and said power module body, such that said adapter bracket and said valve stem may be rotated together to cause said valve to operate.

8. A device for sensing a leak comprising:
a. at least two cells, each of said cells comprising an electrolyte stored within said cell in a dry state;
b. a wick arrangement having one end for receiving moisture and another end for dispersing said moisture to said electrolyte, said moisture dispersing end of said wick arrangement including at least two elements; whereby when said moisture receiving end is wetted by said leak, said moisture transmits along to said at least two elements of said moisture dispersing end;
c. at least two pairs of an anode and cathode combination, each pair being positioned within each cell and said combination being arranged positionally separated adjacent said electrolyte; each pair being associated with one of said elements, said moisture mixing with said electrolyte when said wick arrangement is wetted; and
d. said electrolyte upon being wetted, forms an electric current to flow between said anode and cathode.

9. The device of claim 8, further wherein said at least two elements join at a single moisture receiving end in such a way that said moisture wets said electrolyte in each cell in about the same amount of time thereby ensuring each cell is capable of supplying its share of electric current to activate said device substantially simultaneously.

10. The device of claim 8 further comprising:
e. a water tight container for housing said anode, said cathode, said electrolyte and said moisture dispersing end of said wick; and
f. said moisture receiving end of said wick extends from and is disposed outside of said container, and said moisture being capable of reaching said electrolyte only via said wick arrangement.

11. The device of claim 10 further comprising:
g. a sleeve extending from said container, said moisture receiving end of said wick being disposed within said sleeve and extending from said sleeve.

12. The device of claim 8 further comprising:
e. a water tight container for housing said anode, said cathode, said electrolyte and said moisture dispersing end of said wick; and
f. a sleeve extending from said container, said moisture receiving end of said wick being disposed within said sleeve such that an interior of said container and an interior of said sleeve being in fluid communication with each other.

13. The device of claim 8 further comprising a valve operatively associated with said device and said valve further being operative to close upon receiving said electric current from said cell, whereby when said device detects said leak, said valve is closed.

14. The device of claim 13 wherein said valve is a manual valve having a valve stem, said stem having a longitudinal rotational axis, and wherein said device further comprises a retrofit valve control apparatus for providing electrical control of said manual valve and being operatively associated with said manual valve and said device, said retrofit valve control apparatus comprising:
a power module for receiving said electric current, said power module including a body and a drive shaft rotatable relative to said body, said shaft being electrically rotatably driven relative to said body in response to said electric current; and
an adapter bracket coupled to said drive shaft of said power module;
means for attaching said adapter bracket relative to said valve stem of said manual valve such that rotation of said adapter bracket causes rotation of said valve stem; and
said valve stem being rotated by energizing said power module causing said shaft of said power module to rotate relative to said body of said power module and said energizing of said power module causing said valve to close.

15. The device of claim 14 wherein said retrofit valve control apparatus further comprises:

stop means for securing said body of said power module relative to a stationary object; and means for locking said shaft of said power module relative to said adapter bracket such that said stop means may be detached from the stationary object and said power module body, such that said adapter bracket and said valve stem may be rotated together to cause said valve to operate.

16. The device of claim 8, further wherein said at least two cells are arranged in series to form said electric current.

17. The device of claim 8, further wherein said at least two cells are arranged in parallel to form said electric current.

18. A device for sensing a leak comprising:

a. at least two cells, each of said cells comprising an electrolyte stored within said cell in a dry state;

b. at least two wick arrangements having one end for receiving moisture and another end for dispersing said moisture to said electrolyte, whereby when said moisture receiving end is wetted by said leak, said moisture transmits along to said moisture dispersing end;

c. at least two pairs of an anode and cathode combination, each pair being positioned within each cell and said combination being arranged positionally separated adjacent said electrolyte; each pair being associated with one of said wick arrangements, said moisture mixing with said electrolyte when said wick arrangement is wetted; and d. said electrolyte upon being wetted, forms an electric current to flow between said anode and cathode.

19. The device of claim 18, further wherein said moisture wets said electrolyte in each cell in about the same amount of time thereby ensuring each cell is capable of supplying its share of electric current to activate said device substantially simultaneously.

* * * * *